(12) United States Patent
Hayamizu

(10) Patent No.: US 9,071,716 B2
(45) Date of Patent: Jun. 30, 2015

(54) SHEET CARRYING APPARATUS AND IMAGE FORMING APPARATUS HAVING SHEET DETECTION POWER SHIFTER

(71) Applicant: KYOCERA Document Solutions Inc., Osaka-shi, Osaka (JP)

(72) Inventor: Hitoshi Hayamizu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/092,084

(22) Filed: Nov. 27, 2013

(65) Prior Publication Data

US 2014/0153005 A1 Jun. 5, 2014

(30) Foreign Application Priority Data

Nov. 30, 2012 (JP) .................................. 2012-262256

(51) Int. Cl.
*G06F 3/12* (2006.01)
*H04N 1/00* (2006.01)

(52) U.S. Cl.
CPC ....... *H04N 1/00891* (2013.01); *H04N 1/00591* (2013.01); *H04N 1/00896* (2013.01); *H04N 1/00488* (2013.01); *H04N 1/0049* (2013.01); *H04N 1/00631* (2013.01); *H04N 1/00689* (2013.01); *H04N 1/00697* (2013.01); *H04N 1/00771* (2013.01)

(58) Field of Classification Search
USPC ................................. 358/1.15, 1.1
See application file for complete search history.

(56) References Cited

U.S. PATENT DOCUMENTS

| 2007/0081065 A1* | 4/2007 | Ootsuka et al. ................ 347/104 |
| 2008/0031641 A1* | 2/2008 | Kaseno et al. .................... 399/9 |
| 2009/0041485 A1 | 2/2009 | Shoji et al. |

FOREIGN PATENT DOCUMENTS

| JP | H-08-069225 A | 3/1996 |
| JP | 2001-328760 A | 11/2001 |
| JP | 2009-057208 A | 3/2009 |

OTHER PUBLICATIONS

English language abstract and machine translation of JP H-08-069225, published Mar. 12, 1996.
English language abstract and machine translation of JP2001-328760A, published Nov. 27, 2001.
English language abstract and machine translation of JP2009-057208A, published Mar. 19, 2009.

* cited by examiner

*Primary Examiner* — Martin Mushambo
(74) *Attorney, Agent, or Firm* — NDQ&M Watchstone LLP

(57) ABSTRACT

A sheet carrying apparatus comprises a job executing portion that includes a sheet carrying portion for carrying a sheet, a power supply portion that performs usual power supply to the job executing portion in a usual mode and stops the power supply to the job executing portion in a power saving mode that restricts the power supply more than the usual mode; an ejecting portion into which the sheet carried by the sheet carrying portion is ejected, and an ejected sheet detecting portion that detects presence of the sheet ejected in the ejecting portion, and when there is no sheet in the ejecting portion after a job including ejecting of the sheet into the ejecting portion ends, the power supply portion shifts from the usual mode to the power saving mode.

4 Claims, 3 Drawing Sheets

SHEET CARRYING APPARATUS AND IMAGE FORMING APPARATUS HAVING SHEET DETECTION POWER SHIFTER

INCORPORATION BY REFERENCE

This application is based on and claims the benefit of priority from Japanese Patent Application No. 2012-262256 filed on Nov. 30, 2012, the contents of which are hereby incorporated by reference.

BACKGROUND

The present disclosure relates to a sheet carrying apparatus and an image forming apparatus having the same.

In recent years, image forming apparatuses have been increasingly requested to save power. Because of this, an image forming apparatus is proposed, which incorporates a power saving mode that restricts power supply more than a usual mode.

In an image forming apparatus that incorporates the power saving mode, usually when the image forming apparatus is not used and a predetermined threshold period elapses, the usual mode is shifted to the power saving mode. Upon shifting to the power saving mode, power supply to each portion (job executing portion) of the image forming apparatus executing a job is shut down, whereby the power consumption is reduced.

In the structure in which it is determined based on the not-used period of the image forming apparatus whether to shift to the power saving mode or not, if a threshold period which is a determination criterion for determining whether to shift to the power saving mode or not is set long, the timing to shift from the usual mode to the power saving mode delays (it takes a long time to shift to the power saving mode). In other words, in this case, after the job ends, the power supply to the job executing portion is continued for a long time; thereafter, the shift to the power saving mode is performed. Accordingly, the power saving effect declines.

On the other hand, if the threshold period which is the determination criterion for determining whether to shift to the power saving mode or not is set short, the disadvantage that the timing to shift from the usual mode to the power saving mode delays is solved. However, if a user goes away temporarily from the image forming apparatus during a time of operating the image forming apparatus (e.g., when the user is changing a set value by using an operating panel), the usual mode is likely to be shifted to the power saving mode, which is inconvenient to the user.

In the meantime, in the conventional image forming apparatus, the operating panel is equipped with, for example, a hard key for receiving a shift instruction for shifting to the power saving mode. Because of this, even if an elapsing period after the image forming apparatus is stopped does not reach the threshold period, it is possible to quickly shift to the power saving mode by performing an operation for shifting to the power saving mode. However, for the user, it is cumbersome and inconvenient to additionally perform the operation for shifting to the power saving mode.

SUMMARY

The present disclosure has been made to solve the above problem, and it is an object of the present disclosure to provide a sheet carrying apparatus and an image forming apparatus having the same that are able to raise a power saving effect without impairing convenience for a user.

To achieve the above object, a sheet carrying apparatus according to the present disclosure comprises: a job executing portion, a power supply portion, an ejecting portion, and an ejected sheet detecting portion. The job executing portion includes a sheet carrying portion for carrying a sheet. The power supply portion performs usual power supply to the job executing portion in a usual mode and stops the power supply to the job executing portion in a power saving mode that restricts the power supply more than the usual mode. The sheet carried by the sheet carrying portion is ejected into the ejecting portion. The ejected sheet detecting portion detects presence of the sheet ejected in the ejecting portion. And when the ejected sheet detecting portion detects that there is no sheet in the ejecting portion after a job including the ejecting of the sheet into the ejecting portion ends, the power supply portion shifts from the usual mode to the power saving mode.

DETAILED DESCRIPTION

Hereinafter, as an example of an image forming apparatus that includes a sheet carrying apparatus according to an embodiment of the present disclosure, a multi-function machine, which is capable of executing various kinds of jobs such as a printing job, a scanning job and the like, is described.

(Whole Structure of Image Forming Apparatus)

Figure 1:
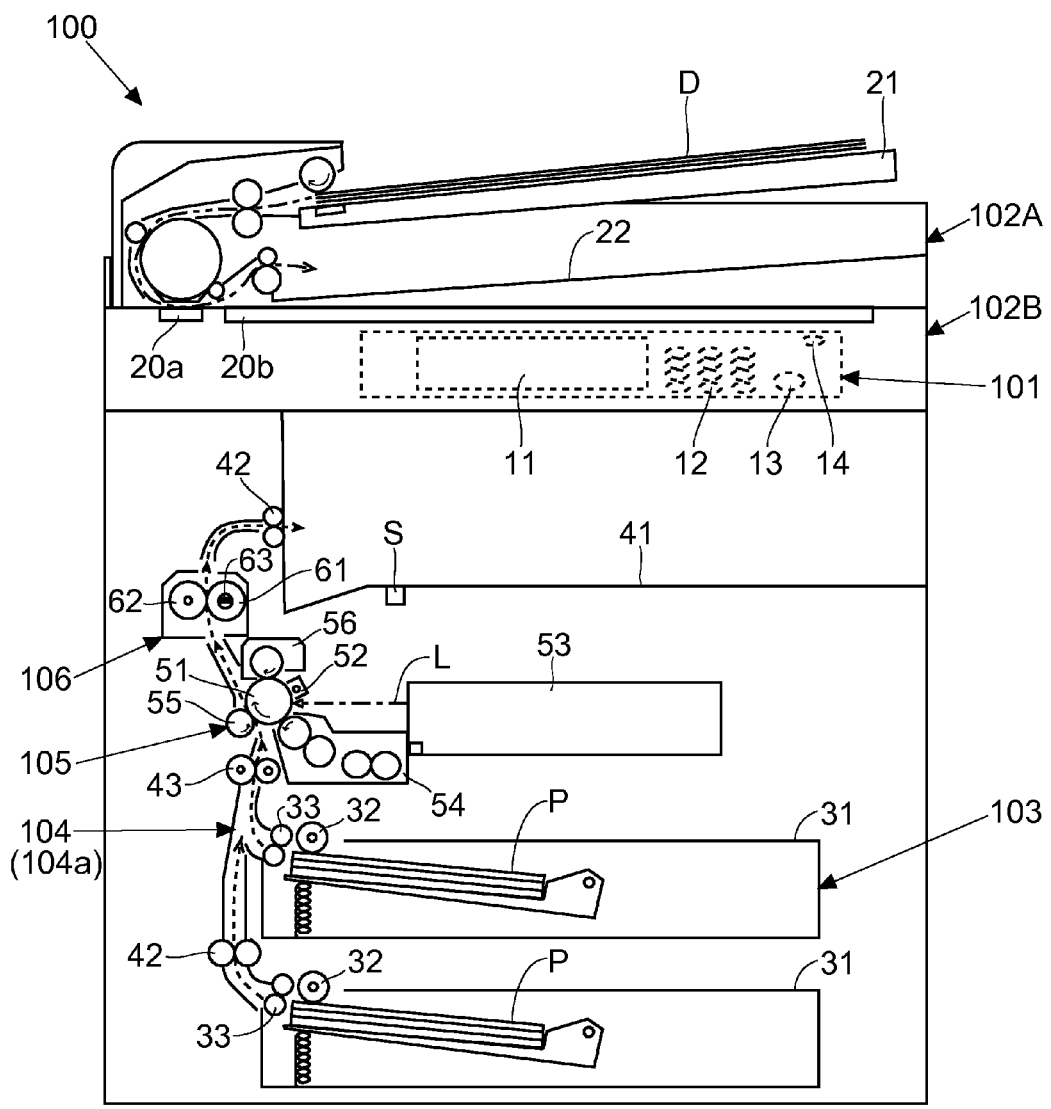
FIG. 1 is a schematic view of an image forming apparatus that includes a sheet carrying apparatus according to an embodiment of the present disclosure.

As shown in FIG. 1, an image forming apparatus 100 according to the present embodiment includes an operating panel 101, a document carrying portion 102A, an image reading portion 102B, a paper sheet supplying portion 103, a paper sheet carrying portion 104, an image forming portion 105, and a fixing portion 106. Each of the document carrying portion 102A, the image reading portion 102B, the paper sheet supplying portion 103, the paper sheet carrying portion 104, the image fanning portion 105, and the fixing portion 106 is a portion that executes a job, and there is a case where they are collectively called a job executing portion in the following description.

The operating panel 101 has a liquid crystal display portion 11 whose display surface is covered by a touch panel. The liquid crystal display portion 11 displays various screens which dispose a set item whose set value is variable when a job is executed, a soft key for changing the set value of the set item, a message indicating a state of the image forming apparatus 100 and the like. Besides, the operating panel 101 is also equipped with hard keys such as a ten-key pad 12 for receiving a numerical input, a start key 13 for receiving an instruction for executing a job and the like.

The document carrying portion 102A pulls out a document D set on a document setting tray 21, sends the document onto a carrying-reading contact glass 20a, and ejects it into an document ejecting tray 22. In the meantime, the document carrying portion 102A has also a function to depress the document D placed on a placing-reading contact glass 20b.

The image reading portion 102B performs reading of the document D to generate image data of the document D. Although not shown, the image reading portion 102B is equipped with optical members such as an exposing lamp, a mirror, a lens, an image sensor and the like. And the image reading portion 102B shines light onto the document D passing carrying-reading contact glass 20a or the document D placed on the placing-reading contact glass 20b, applies A/D conversion to an output value from an image sensor that receives reflected light from the document D, thereby generating the image data. In this way, it is possible to perform printing based on the image data obtained by the scanning performed by the image reading portion 102B. Besides, it is also possible to store the image data obtained by the scanning.

The paper sheet supplying portion 103 has a paper sheet cassette 31 that accommodates a paper sheet P (which corresponds to a "sheet" in the present disclosure), and supplies the paper sheet P accommodated in the paper sheet cassette 31 to the paper sheet carrying portion 104 (paper sheet carrying path 104a). The paper sheet supplying portion 103 is equipped with a pick-up roller 32 for pulling out the paper sheet P accommodated in the paper sheet cassette 31, and a pair of separating rollers 33 for preventing overlapped carrying of the paper sheet P.

The paper sheet carrying portion 104 carries the paper sheet P along the paper sheet carrying path 104a and finally guides the paper sheet to an ejecting tray 41. In the meantime, the paper sheet carrying portion 104 corresponds to a "sheet carrying portion" in the present disclosure, and the ejecting tray 41 corresponds to an "ejecting portion" in the present disclosure. The paper sheet carrying portion 104 has a plurality of pairs of carrying rollers 42 that are rotatably disposed in the paper sheet carrying path 104a. Besides, the paper sheet carrying portion 104 has a pair of registration rollers 43 that are disposed at an upstream position (position right before the image forming portion 105) in a paper sheet carrying direction with respect to the image forming portion 105. The pair of registration rollers 43 make the paper sheet P wait right before the image forming portion 105 and sends the paper sheet P at a controlled timing to the image forming portion 105.

The image forming portion 105 forms a toner image based on the image data and transfers the toner image to the paper sheet P. The image forming portion 105 includes a photoreceptor drum 51, an electrifying apparatus 52, an exposing apparatus 53, a developing apparatus 54, a transferring roller 55, and a cleaning apparatus 56.

During an image forming time, the photoreceptor drum 51 rotates, and the electrifying apparatus 52 electrifies a surface of the photoreceptor drum 51 to a predetermined potential. Besides, the exposing apparatus 53 outputs a light beam L based on the image data to scan the surface of the photoreceptor drum 51. In this way, an electrostatic latent image is formed on the surface of the photoreceptor drum 51. The developing apparatus 54 supplies toner to the electrostatic latent image formed on the surface of the photoreceptor drum 51 to develop the image.

The transferring roller 55 is in tight contact with the surface of the photoreceptor drum 51 to be rotatable. And the pair of registration rollers 43 send the paper sheet P between the transferring roller 55 and the photoreceptor drum 51 at a controlled timing. At this time, a transferring voltage is applied to the transferring roller 55. In this way, the toner image on the surface of the photoreceptor drum 51 is transferred to the paper sheet P. Then, the cleaning apparatus 56 removes toner and the like remaining on the surface of the photoreceptor drum 51.

The fixing portion 106 heats and pressurizes the toner image transferred to the paper sheet P to fix the toner image. The fixing portion 106 includes a heating roller 61 and a pressurizing roller 62. The heating roller 61 incorporates a heater 63. The pressurizing roller 62 comes into tight contact with the heating roller 61. And the paper sheet P to which the toner image is transferred passes between the heating roller 61 and the pressurizing roller 62 to be heated and pressurized. In this way, the toner image is fixed on the paper sheet P and the printing is completed. Then, the printed paper sheet P is sent to the ejecting tray 41 by the pair of carrying rollers 42.

(Hardware Structure of Image Forming Apparatus)

Figure 2:
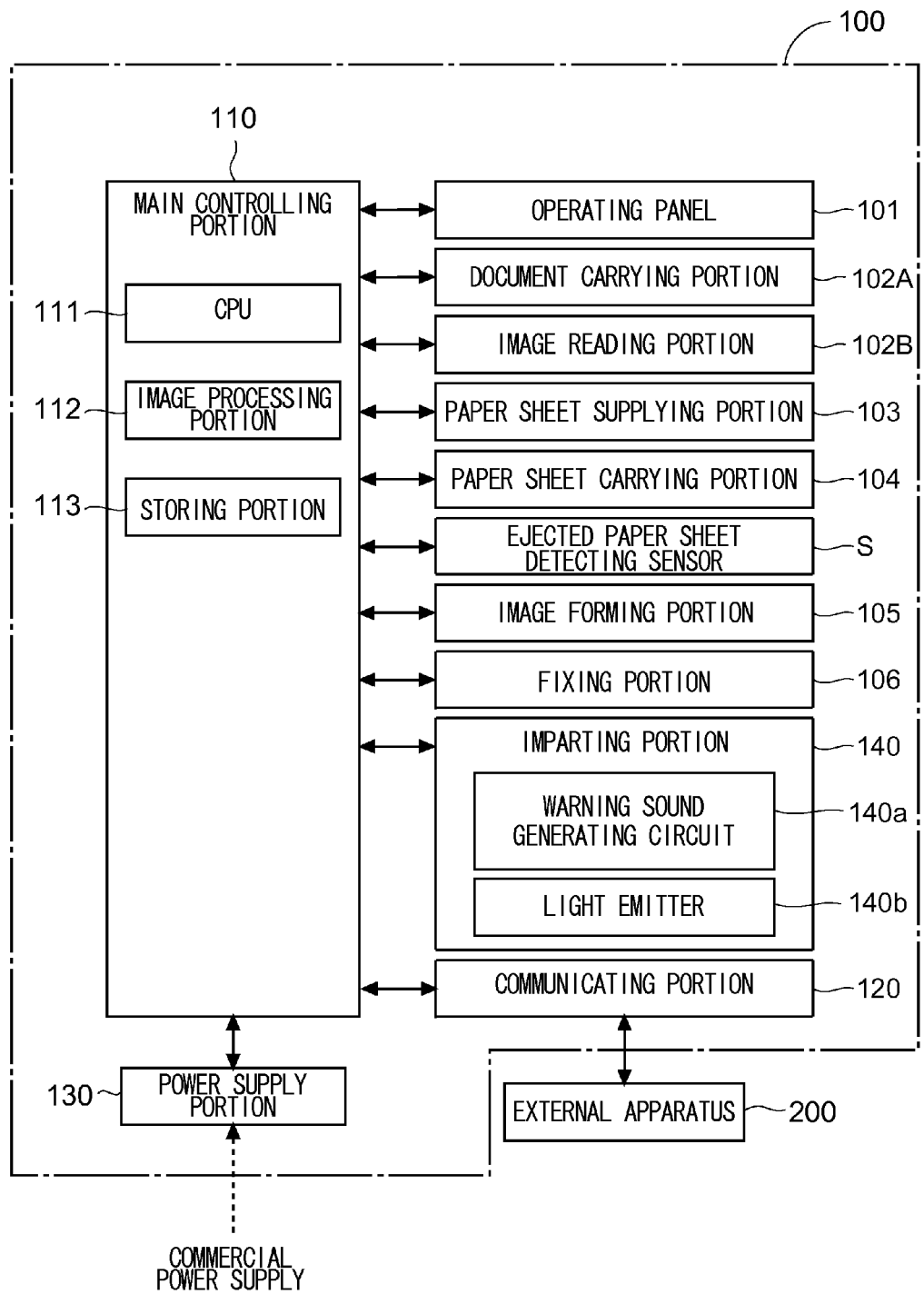
FIG. 2 is a block diagram for describing a hardware structure of the image forming apparatus shown in FIG. 1.

As shown in FIG. 2, the image forming apparatus 100 includes a main controlling portion 110. The main controlling portion 110 includes a CPU 111, an image processing portion 112, and a storing portion 113. The image processing portion 112 includes an ASIC dedicated to image processing, a memory and the like and applies various image processings (enlargement/reduction, concentration change, data format conversion and the like) to the image data. The storing portion 113 includes a ROM, a RAM and the like: for example, a program and data necessary for executing a job are stored in the ROM and the program and data are deployed in the RAM.

The main controlling portion 110 is connected to the operating panel 101, the document carrying portion 102A, the image reading portion 102B, the paper sheet supplying portion 103, the paper sheet carrying portion 104, the image forming portion 105, and the fixing portion 106. And based on the program and data stored in the storing portion 113, the main controlling portion 110 performs whole control, image processing control, display control, driving control of various motors and the like. Further, the main controlling portion 110 is connected to various detecting sensors that detect a state of the image forming apparatus 100 and recognizes the state of the image forming apparatus 100 based on outputs from the detecting sensors.

As the detecting sensor that detects the state of the image forming apparatus 100, an ejected paper sheet detecting sensor S for detecting presence of the paper sheet P ejected in the ejecting tray 41 is disposed on a lower surface of the ejecting tray 41. For example, the ejected paper sheet detecting sensor S is a light sensor that has a light emitting portion that emits light to a region (region onto which the paper sheet P is ejected) on a surface of the ejecting tray 41 and a light receiving portion that receives reflected light. In other words, when the paper sheet P is ejected into the ejecting tray 41, the light from the light emitting portion is reflected by the paper sheet P; accordingly, the light receiving portion receives the reflected light. On the other hand, when the paper sheet P is removed from the ejecting tray 41, the light from the light emitting portion is not reflected by the paper sheet P (the light receiving portion does not receive the reflected light). Accordingly, the output from the ejected paper sheet detecting sensor S changes when the paper sheet P remains in the ejecting tray 41 and when the paper sheet P is removed from the ejecting tray 41.

Or as the ejected paper sheet detecting sensor S, a light sensor, which has an actuator that rotates between the light emitting portion and the light receiving portion and protrudes to a region of the surface of the ejecting tray 41, may be used. In this case, when the paper sheet P is ejected into the ejecting tray 41, the paper sheet P hits the actuator (the actuator rotates), whereby a light path between the light emitting portion and the light receiving portion is shut down (or opened), while when the paper sheet P is removed from the ejecting tray 41, the actuator returns to the original position, whereby the light path between the light emitting portion and the light receiving portion is opened (or shut down). Accordingly, the output from the rejected paper sheet detecting sensor S changes when the paper sheet P remains in the ejecting tray 41 and when the paper sheet P is removed from the ejecting tray 41.

In this way, based on the output from the ejected paper sheet detecting sensor S, the main controlling portion 110 can detect presence of the paper sheet P ejected in the ejecting tray 41. In other words, the main controlling portion 110 corresponds to an "ejected sheet detecting portion" in the present disclosure. In the meantime, a sensor other than the light sensor may be used as the ejected paper sheet detecting sensor S.

For example, the paper sheet P heated by the fixing portion 106 is ejected into the ejecting portion 41. Accordingly, if a temperature sensor including a thermistor and the like is disposed as the ejected paper sheet detecting sensor S in the ejecting tray 41, it is possible to detect presence of the paper sheet P ejected in the ejecting tray 41 based on an output from the temperature sensor as the ejected paper sheet detecting sensor S. Besides, also a weight sensor including a load cell and the like may be used as the ejected paper sheet detecting sensor S.

Besides, the main controlling portion 110 is connected to a communicating portion 120. The communicating portion 120 is connected to an external apparatus 200 over a network and communicates with the external apparatus 200. In this way, it is possible to perform printing based on image data transmitted from the external apparatus 200 and also possible to transmit the image data obtained by the scanning to the external apparatus 200. The external apparatus 200 is, for example, a user terminal, a server, a facsimile apparatus or the like.

Besides, the main controlling portion 110 is connected to a power supply portion 130. The power supply portion 130 is connected to a commercial power supply to generate a voltage necessary to make each portion of the image forming apparatus 100 operate. And the power supply portion 130 supplies electric power to all the portions of the image forming apparatus 100 (performs usual power supply to the job executing portion). On the other hand, when the power supply portion 130 shifts from the usual mode to the power saving mode, the power supply portion 130 supplies power to only a portion of the image forming apparatus 100 and stops the power supply to the other portions (stops the power supply to the job executing portion).

For example, the main controlling portion 110 counts a not-used period during which the image forming apparatus 100 is not used, makes the power supply portion 130 perform the power supply to only a portion of the image forming apparatus 100 if the not-used period of the image forming apparatus 100 exceeds a predetermined threshold period, and makes the power supply portion shift from the usual mode to the power saving mode. Or also in a case where the operating panel 101 receives an instruction for shifting from the usual mode to the power saving mode (e.g., case where a power saving key 14 (see FIG. 1) disposed in the operating panel 101 is pushed down), the main controlling portion 110 makes the power supply portion shift from the usual mode to the power saving mode.

In the power saving mode, if the power supply portion 130 receives, from a return condition detecting portion, a signal indicating that a condition for returning from the power saving mode to the usual mode is met, the power supply portion 130 resumes the power supply to all the portions of the image forming apparatus 100 and returns from the power saving mode to the usual mode. In the meantime, in the power saving mode, to receive, from the return condition detecting portion, the signal indicating that the condition for returning from the power saving mode to the usual mode, the power supply portion continues the power supply to the return condition detecting portion even in the power saving mode.

The operating panel 101 is a portion that corresponds to the return condition detecting portion. For example, if the operating panel 101 is operated in the power saving mode (the touch panel and the hard key are pushed down), the operating panel 101 transmits the signal, which indicates that the condition for returning from the power saving mode to the usual mode is met, to the power supply portion 130. And if the power supply portion 130 receives the signal from the operating panel 101 in the power saving mode, the power supply portion 130 returns from the power saving mode to the usual mode.

Besides, the communicating portion 120 also functions as the return condition detecting portion. In other words, if the communicating portion 120 receives data from the external apparatus 200 in the power saving mode, the communicating portion 120 transmits the signal, which indicates that the condition for returning from the power saving mode to the usual mode is met, to the power supply portion 130. And if the power supply portion 130 receives the signal from the communicating portion 120 in the power saving mode, the power supply portion 130 returns from the power saving mode to the usual mode.

Further, although not shown, a detecting sensor, which detects that the document D is set in the document setting tray 21, and a detecting sensor, which detects mounting/demounting of the paper sheet cassette 31, also function as the return condition detecting portion. In other words, in the power saving mode, if the document D is set in the document setting cassette 21 or the paper sheet cassette 31 is mounted or demounted, the power supply portion 130 returns from the power saving mode to the usual mode.

Besides, the main controlling portion 110 is connected to the imparting portion 140. The imparting portion 140 receives an instruction from the main controlling portion 110 to emit a sound or light, thereby making the user recognize the state of the image forming apparatus 100. The imparting portion 140 is described in detail later.

And in the present embodiment, the aggregate, which includes the paper sheet carrying portion 104, the main controlling portion 110, the power supply portion 130 and the imparting portion 140, corresponds to a "sheet carrying apparatus" in the present disclosure.

(Shift from the Usual Mode to the Power Saving Mode Based on the Output from the Ejected Paper Sheet Detecting Sensor)

When the image forming apparatus 100 receives from the user an instruction for executing the printing job that includes the ejecting of the paper sheet P into the ejecting tray 41, the image forming apparatus 100 performs the printing on the paper sheet P and ejects the printed paper sheet P into the ejecting tray 41. And usually, in a case where the user does not successively issue an instruction for executing a job after the printing job ends, the user removes the paper sheet P ejected in the ejecting tray 41. In other words, after the paper sheet P ejected in the ejecting tray 41 is removed by the user, the image forming apparatus 100 is not used and a somewhat long period elapses. During this period, if the power supply to all the portions of the image forming apparatus 100 is continued, the power is consumed wastefully.

Because of this, if the not-used period of the image forming apparatus 100 exceeds the predetermined threshold period, the main controlling portion 110 makes the power supply portion 130 shift from the usual mode to the power saving mode to prevent the wasteful power consumption. However, in a case where the threshold period, which is the criterion for determining whether to shift to the power saving mode or not, is set long, the timing of shifting from the usual mode to the power saving mode delays (it takes a long time to shift to the power saving mode). In other words, the power saving effect declines. In the meantime, in a case where the threshold period is set short, if the user temporarily goes away from the image forming apparatus 100 during the time the user should be operating the image forming apparatus 100 (e.g., during the time the user should be changing the set value by using the operating panel 101), there is a case where the usual mode is shifted to the power saving mode, which is inconvenient to the user.

Accordingly, in the present embodiment, after the job including the ejecting of the paper sheet P into the ejecting tray 41 ends, based on the output from the ejected paper sheet detecting sensor S, the main controlling portion 110 detects presence of the paper sheet P ejected in the ejecting tray 41 (detects whether the user removes the paper sheet P from the ejecting tray 41). And after the printing job ends, when the main controlling portion 110 detects, based on the output from the ejected paper sheet detecting sensor S, that there is no paper sheet P in the ejecting tray 41 (when the user removes the paper sheet P from the ejecting tray 41), the main controlling portion 110 instructs the power supply portion 130 to shift from the usual mode to the power saving mode. In other words, after the printing job ends, when the main controlling portion 110 detects that there is no paper sheet P in the ejecting tray 41, the power supply portion 130 shifts from the usual mode to the power saving mode irrespective of whether the not-used period of the image forming apparatus 100 exceeds the threshold period or not.

In the meantime, there is a case where the user forgets to remove the paper sheet P ejected in the ejecting tray 41 after the printing job ends. In this case, irrespective of the fact that the printing job ends, the power supply portion does not shift to the power saving mode, whereby the power is consumed wastefully. Because of this, the main controlling portion 110 is connected to the imparting portion 140 which imparts that the paper sheet P remains in the ejecting tray 41. For example, the imparting portion 140 includes a warning sound generating circuit 140a that generates a warning sound (beep sound or voice). And after the printing job ends, when the predetermined period during which it is detected that there is the paper sheet P in the ejecting tray 41 elapses (when the output value from the ejected paper sheet detecting sensor S does not change to a value which indicates that there is no paper sheet P and the predetermined period elapses), the main controlling portion 110 instructs the imparting portion 140 to impart that the paper sheet P remains in the ejecting tray 41. In other words, the imparting portion 140 generates the warning sound.

In the meantime, the imparting portion 140 may impart that the paper sheet P remains in the ejecting tray 41 by disposing a light emitter 140b such as an LED or the like in the imparting portion 140 and turning on and off the light emitter 140b.

Besides, in the case where the user forgets to remove the paper sheet P ejected in the ejecting tray 41 after the printing job ends, the power supply portion does not shift to the power saving mode irrespective of the fact that the printing job ends, whereby the power is consumed wastefully; however, if the not-used period of the image forming apparatus 100 exceeds the predetermined threshold period, the main controlling portion 110 makes the power supply portion 130 shift from the usual mode to the power saving mode. In this way, after that, the wasteful power consumption is prevented.

Hereinafter, the shift operation from the usual mode to the power saving mode based on the output from the ejected paper sheet detecting sensor S is described following a flow chart shown in FIG. 3.

Figure 3:
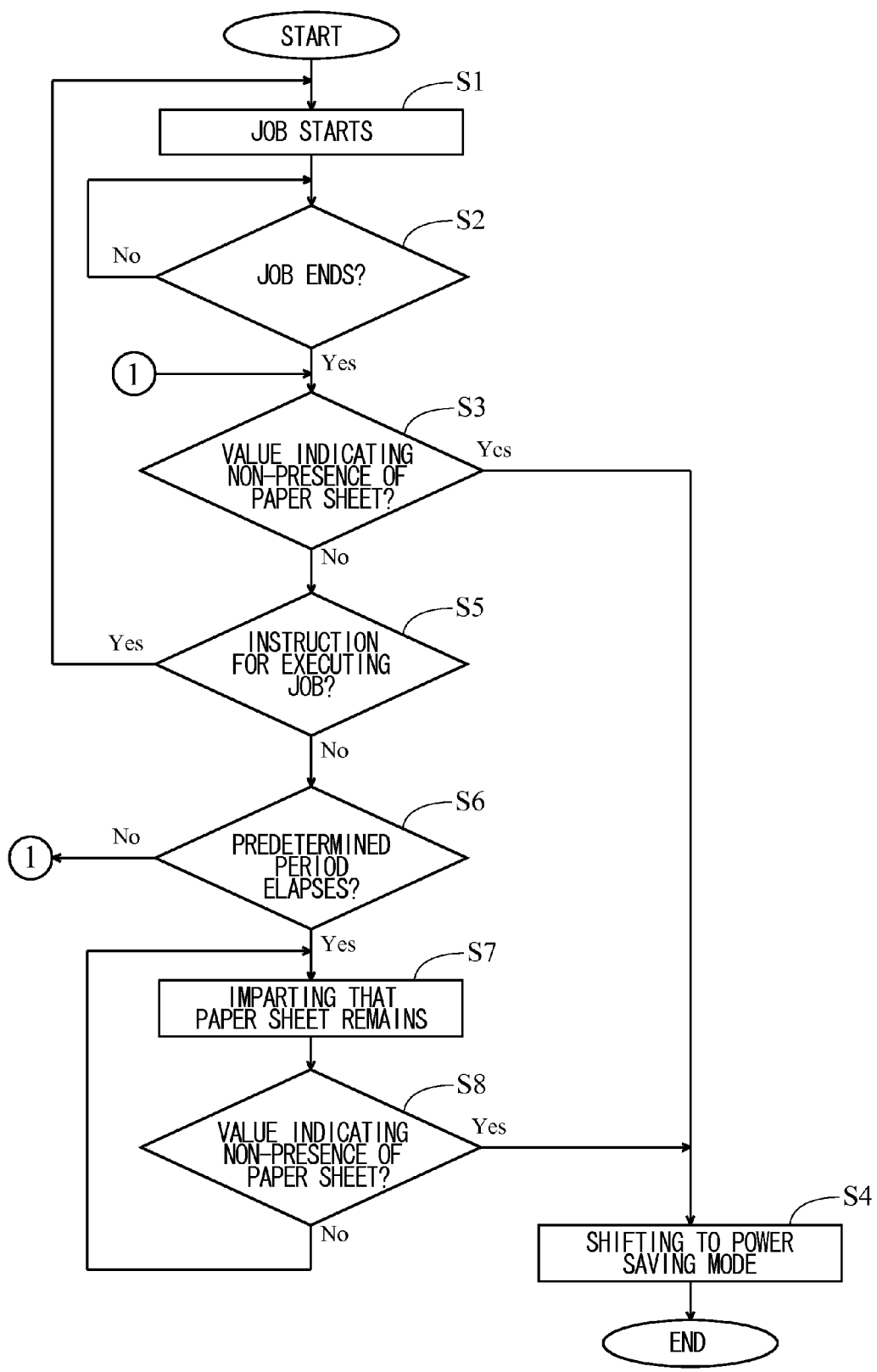
FIG. 3 is a flow chart for describing an operation when a usual mode is shifted to a power saving mode in the image forming apparatus shown in FIG. 1.

First, the flow chart in FIG. 3 starts when the instruction for executing the job (printing job) including the ejecting of the paper sheet P into the ejecting tray 41 is received. Upon receiving the instruction for executing the job, in a step S1, the main controlling portion 110 instructs the job executing portion to start the job. In other words, the paper sheet supplying portion 103 supplies the paper sheet P to the paper sheet carrying portion 104. The paper sheet carrying portion 104 carries the paper sheet P sequentially to the image forming portion 105 and the fixing portion 106. The image forming portion 105 forms a toner image and transfers the toner image to the paper sheet P, and the fixing portion 106 fixes the toner image on the paper sheet P. And the paper sheet carrying portion 104 ejects the printed paper sheet P into the ejecting tray 41. In this way, the output value from the ejected paper sheet detecting sensor S becomes a value that indicates the presence of the paper sheet P.

Then, in a step S2, the main controlling portion 110 determines whether the job ends or not. As a result of this, if it is determined that the job ends, the process goes to a step S3; if the job does not end, the determination in the step S2 is repeated.

Upon going to the step S3, based on the output from the ejected paper sheet detecting sensor S, the main controlling portion 110 detects presence of the paper sheet P ejected in the ejecting tray 41. In other words, the main controlling portion 110 determines whether the output value from the ejected paper sheet detecting sensor S changes from the value for indicating the presence of the paper sheet P to the value indicating the non-presence of the paper sheet P (whether there is no paper sheet P in the ejecting tray 41 or not) or not. As a result of this, if it is detected that there is no paper sheet P in the ejecting tray 41, the main controlling portion 110 goes to a step S4 to make the power supply portion 130 shift from the usual mode to the power saving mode. In other words, the power supply portion 130 supplies the power to only a portion of the image forming apparatus 100 and stops the power supply to the portions other than the supplied portion (stops the power supply to the job executing portion).

On the other hand, in a case where it is not detected that there is no paper sheet P in the ejecting tray 41 (case where there is paper sheet P in the ejecting tray 41), the main controlling portion 110 goes to a step S5. Upon going to the step S5, the main controlling portion 110 determines whether the next instruction for executing the job is received or not. As a result of this, if it is determined that the instruction for executing the job is received, the main controlling portion goes to the step S1, while if the instruction for executing the job is not received, the main controlling portion goes to a step S6.

Upon going to the step S6, the main controlling portion 110 determines whether the predetermined period during which there is the paper sheet P in the ejecting tray 41 elapses nor not after the job ends. As a result of this, if it is determined that the predetermined period elapses, the main controlling portion goes to a step S7, while if the predetermined period does not elapse, the main controlling portion goes to the step S3.

Upon going to the step S7, the main controlling portion 110 makes the imparting portion 140 impart that the paper sheet P remains in the ejecting tray 41. And in a step S8, based on the output from the ejected paper sheet detecting sensor S, the main controlling portion 110 detects presence of the paper sheet P ejected in the ejecting tray 41 (detects whether there is no paper sheet P in the ejecting tray 41 or not). As a result of this, if it is detected that there is no paper sheet P in the ejecting tray 41, the main controlling portion goes to the step S4, while if it is detected that there is the paper sheet P in the ejecting tray 41, the main controlling portion goes to the step S7.

In the meantime, in the case of detecting the non-presence of the paper sheet P in the step S3 and step S8 and going to the step S4, when performing the shift to the power saving mode, the shift to the power saving mode may be performed after a somewhat delay period.

Besides, in the step S8, the non-presence of the paper sheet P is detected and the shift to the power saving mode is performed (going to the step S4); however, even if the presence of the paper sheep P is detected in the step S8, in the case where the predetermined threshold period is exceeded after the job ends in the step S2, the shift to the power saving mode may be performed (going to the step S4).

As described above, the image forming apparatus 100 according to the present embodiment comprises: the job executing portion that includes the paper sheet carrying portion 104 (sheet carrying portion) which carries the paper sheet P (sheet); the power supply portion 130 that performs the usual power supply to the job executing portion in the usual mode and stops the power supply to the job executing portion in the power saving mode which restricts the power supply more than the usual mode; the ejecting tray 41 (ejecting portion) into which the paper sheet P carried by the paper sheet carrying portion 104 is ejected; and the main controlling portion 110 (ejected sheet detecting portion) that detects presence of the paper sheet P ejected in the ejecting tray 41. And when the main controlling portion 110 detects that there is no paper sheet P in the ejecting tray 41 after the job including the ejecting of the paper sheet P into the ejecting tray 41 ends, the power supply portion 130 shifts from the usual mode to the power saving mode.

According to the present embodiment, when the main controlling portion 110 detects that there is no paper sheet P in the ejecting tray 41 after the job including the ejecting of the paper sheet P into the ejecting tray 41 ends (i.e., when the user removes the paper sheet P ejected in the ejecting tray 41), the power supply portion 130 shifts from the usual mode to the power saving mode. In this way, after the job including the ejecting of the paper sheet P into the ejecting tray 41 ends, it is possible to prevent the wasteful power supply to the job executing portion from being continued by the power supply portion 130 irrespective of the fact that the job is not executed. As a result of this, the power consumption declines and the power saving effect rises.

Further, the shift to the power saving mode is quickly performed without executing additionally an operation for shifting to the power saving mode (the shift to the power saving mode is automatically performed by only removing the paper sheet P from the ejecting tray 41); accordingly, it is convenient for the user who desires to shift to the power saving mode immediately after the job including the ejecting of the paper sheet P into the ejecting tray 41 ends.

Besides, in the present embodiment, as described above, the imparting portion 140 is disposed, which imparts that the paper sheet P remains in the ejecting tray 41 when the predetermined period during which the main controlling portion 110 detects the presence of the paper sheet P elapses (the paper sheet P remains in the ejecting tray 41) after the job including the ejecting of the paper sheet P into the ejecting tray 41 ends. In this way, it is possible to prevent the paper sheet P from being left in the ejecting tray 41. In other words, it is possible to prevent the elapse of a long time during which the usual mode is not shifted to the power saving mode (prevent the power from being wasted over the long time).

It should be considered that the embodiment disclosed this time is an example in all respects and is not limiting. The scope of the present disclosure is not indicated by the above description of the embodiment but by the claims, and all modifications within the scope of the claims and the meaning equivalent to the claims are covered.

For example, in the present embodiment, after the job ends, when the paper sheet P ejected in the ejecting tray 41 is removed, the shift to the power saving mode is performed; however, the present disclosure is not limited to this, but an ejected document detecting sensor (not shown) for detecting presence of the document D may be disposed in the document ejecting tray 22, and after the job ends, when the document D ejected in the document ejecting tray 22 is removed, the shift to the power saving mode may be performed. In this case, the document D corresponds to the "sheet" in the present disclosure, while the document carrying portion 102A corresponds to the "sheet carrying portion" in the present disclosure.

What is claimed is:

1. A sheet carrying apparatus comprising:
a job executing portion that includes a sheet carrying portion for carrying a sheet;
a power supply portion that performs usual power supply to the job executing portion in a usual mode and stops the power supply to the job executing portion in a power saving mode that restricts the power supply more than the usual mode;
an ejecting portion into which the sheet carried by the sheet carrying portion is ejected;
an ejected sheet detecting portion that detects presence of the sheet ejected in the ejecting portion; and
an imparting portion; wherein
when a not-used period during which the apparatus is not used exceeds a predetermined threshold period, the power supply portion is configured to shift from the usual mode to the power saving mode;
when the ejected sheet detecting portion detects that there is no sheet in the ejecting portion before a predetermined period elapses after the job including the ejecting of the sheet into the ejecting portion ends, the power supply portion shifts from the usual mode to the power saving mode irrespective of whether the not-used period exceeds the threshold period or not; and
after the job including the ejecting of the sheet into the ejecting portion ends, when the predetermined period elapses with presence of the sheet in the ejecting portion detected by the ejected sheet detecting portion, the power supply portion does not shift from the usual mode to the power saving mode, and the imparting portion imparts that there is the sheet left in the ejecting portion, thereafter, when the ejected sheet detecting portion detects that there is no sheet in the ejecting portion, the power supply portion shifts from the usual mode to the power saving mode.

2. The sheet carrying apparatus according to claim 1, wherein the imparting portion includes a warning sound generating circuit and imparts that the sheet remains in the ejecting portion by generating a warning sound from the warning sound generating circuit.

3. The sheet carrying apparatus according to claim 1, wherein the imparting portion includes a light emitter and imparts that the sheet remains in the ejecting portion by turning on and off the light emitter.

4. An image forming apparatus comprising the sheet carrying apparatus according to claim 1.

* * * * *